United States Patent

[15] 3,687,119

Hoogeboom

[45] Aug. 29, 1972

[54] CONTROL DEVICE FOR AN OIL AND GAS OPERATED DIESEL ENGINE

[72] Inventor: Adrianus Johannes Theodorus Hoogeboom, Harmelen, Netherlands

[73] Assignee: William Turner Brunot, London, England

[22] Filed: Jan. 8, 1971

[21] Appl. No.: 105,066

Related U.S. Application Data

[63] Continuation of Ser. No. 800,267, Feb. 19, 1969, abandoned.

[52] U.S. Cl. .............................. 123/27 GE, 123/121
[51] Int. Cl. ............................................. F02b 3/00
[58] Field of Search .....123/32, 27, 27 GE, 120, 121, 123/119, 140.3

[56] References Cited

UNITED STATES PATENTS

| | | |
|---|---|---|
| 2,796,055 | 6/1957 | Cornelius ........123/140.3 MC |
| 2,744,511 | 5/1956 | Kauffmann et al. ........123/120 |
| 3,009,794 | 11/1961 | Barfod....................123/120 X |
| 2,876,755 | 3/1959 | Gold et al...........123/140 MC |
| 2,972,988 | 2/1961 | Ranck ........................123/120 |
| 3,215,132 | 11/1965 | Spencer.....................123/120 |
| 3,540,419 | 11/1970 | Fox .......................123/27 GE |

*Primary Examiner*—Laurence M. Goodridge
*Attorney*—Holman & Stern

[57] ABSTRACT

A control device for a compression-ignition engine in which a venturi means forming a part of an exhaust pipe of the engine is connected to a first pipe so that the first pipe receives suction by the passage of exhaust gases through the venturi means. The first pipe is connected to a first chamber from which chamber a second chamber is separated by a flexible diaphragm, and a second pipe connects the second chamber to the exhaust pipe of the engine. A control valve controls the flow of gaseous fuel into the air induction port of the engine and operating means operates the valve in response to movement of the diaphragm. A second venturi means is associated with an air induction pipe for conducting air into the engine for combustion, and a third pipe connected to the second venturi means receives suction by the passage of air through the second venturi means. The third pipe is connected to a third chamber separated by a second flexible diaphragm from the second chamber and separated by a third flexible diaphragm from a fourth chamber. A pipe connects the fourth chamber to the air induction pipe, and the control valve is arranged to control the flow of gaseous fuel into the fourth chamber. An operating member is adapted to be moved by the first, second and third diaphragms to operate the control valve to control the supply of gaseous fuel in accordance with the displacements of the diaphragms.

5 Claims, 3 Drawing Figures

PATENTED AUG 29 1972 3,687,119

INVENTOR
ADRIANUS JOHANNES
BY THEODORUS HOOGEBOOM
Holman, Glascock, Downing & Seebold
ATTORNEYS

CONTROL DEVICE FOR AN OIL AND GAS OPERATED DIESEL ENGINE

This application is a streamlined continuation of my co-pending application, Ser. No. 800,267 filed Feb. 19, 1969 and now abandoned.

BACKGROUND OF THE INVENTION

This invention relates to a control device for compression-ignition engines.

This application is a streamlined continuation of my co-pending application, Ser. No. 800,267 filed Feb. 19, 1969 and now abandoned.

It is known that, with the increase in the load for a fixed engine speed (r.p.m.) of a diesel engine, the exhaust gas temperatures rise. The Bernoulli law states that along any one streamline in a fluid, the energy per unit mass is constant. In view of this law, the fluid pressure, exerted by fluid flowing through a venturi tube, is dependent upon the specific gravity and the squared value of the speed. As the exhaust gas temperature rises, the specific gravity drops and the gas speed increases because the same mass of gas has a greater volume due to thermal expansion (Boyle's Law). This increase in speed then increases the suction by the Bernoulli Law.

In a first known diesel engine construction when the load increases, there is a small drop in r.p.m. as determined by a governor on the diesel ejection pump. When load increases, the governor is arranged to increase the fuel supply, and in practice, this type of governor can achieve a full fuel charge when there is a drop of 50 r.p.m.

In a second known construction, the operator or driver can operate the normal accelerator pedal to increase the fuel injection when the vehicle or r.p.m. slows down due to increased load, such as a gradient.

With the present invention, it is possible to employ either of the above two known methods for maintaining the r.p.m at a constant speed.

SUMMARY OF THE INVENTION

The invention consists in a control device for a compression-ignition engine including a venturi means forming a part of an exhaust pipe of the engine, a first pipe connected to the venturi means to receive suction by the passage of exhaust gases through the venturi means and connected to a first chamber, a second chamber separated from the first chamber by a flexible diaphragm, a second pipe for connecting the second chamber to the exhaust pipe of the engine, a control valve for controlling the flow of gaseous fuel into the air induction port of the engine, and operating means for operating the valve in response to movement of the diaphragm.

The fuel is preferably propane with or without a proportion of butane but it can be butane alone or other combustible liquified gases.

In the most preferred arrangement, the control device includes a second venturi means for insertion into and forming a part of an air induction pipe conducting air into the engine for combustion, a third pipe connected to the second venturi means to receive suction by the passage of air through the second venturi means and connected to a third chamber separated by a second flexible diaphragm from the second chamber and separated by a third flexible diaphragm from a fourth chamber, a pipe connecting the fourth chamber to the air induction pipe, with the control valve being arranged to control the flow of gaseous fuel into the fourth chamber, and an operating member movable by the first, second and third diaphragms to operate the control valve to control the supply of gaseous fuel in accordance with the displacements of the diaphragms.

DETAILED DESCRIPTION OF THE INVENTION

Figure 1:
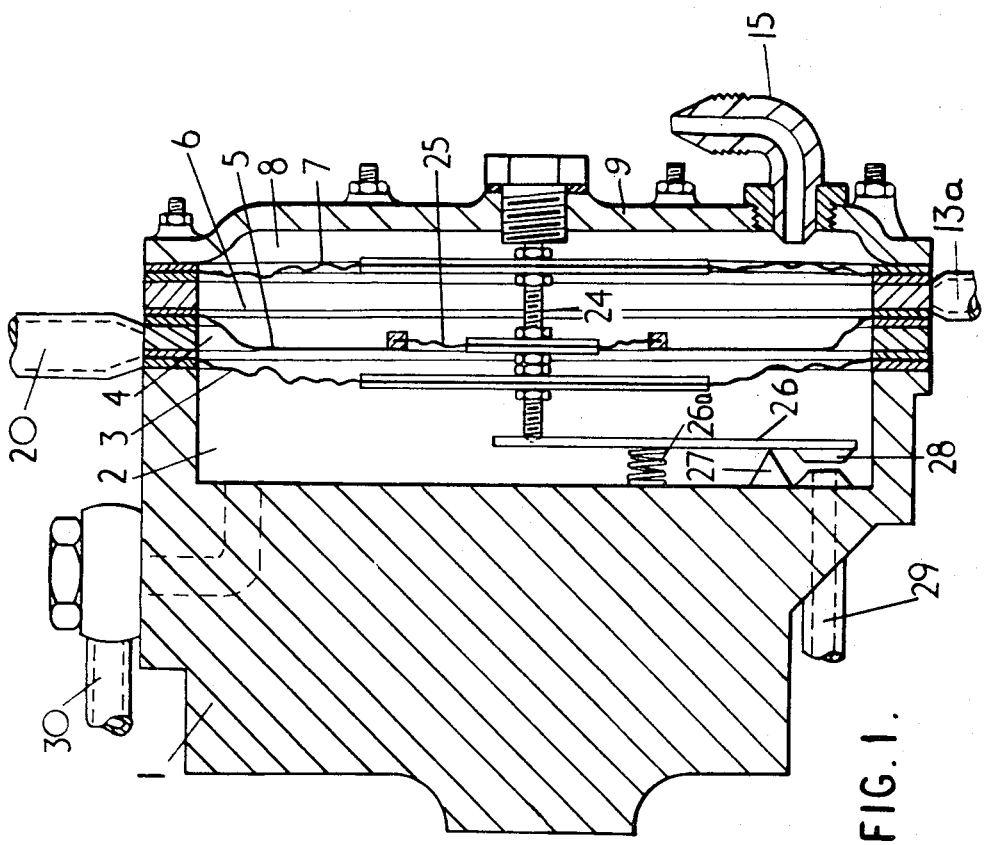
FIG 1 is a view partly in elevation and partly in section through the main part of the device.

In FIG. 1 there is a casing 1 having a first chamber 2 separated by a flexible diaphragm 3 from a second chamber 4 which in turn is separated by a partition wall 5 from a third chamber 6. The chamber 6 is separated by a flexible diaphragm 7 from a fourth chamber 8 and an end plate 9 is bolted to the casing 1.

Figure 2:
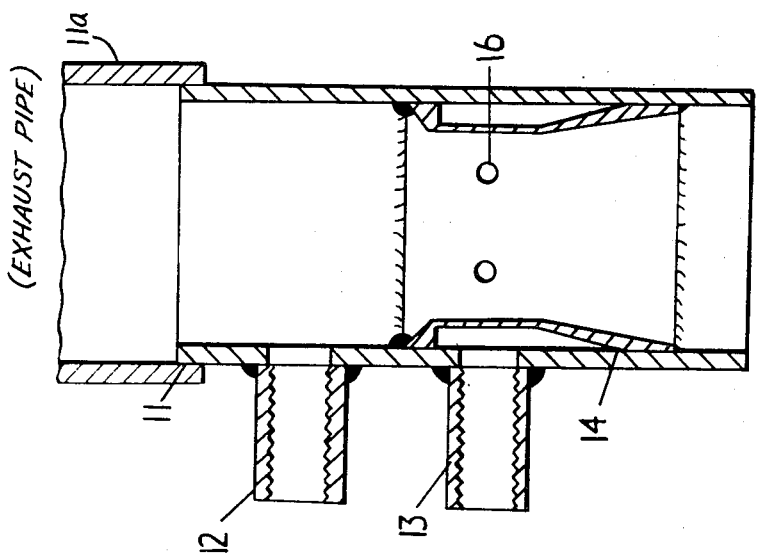
FIG. 2 is a view in section showing the venturi in the exhaust system.
Figure 3:
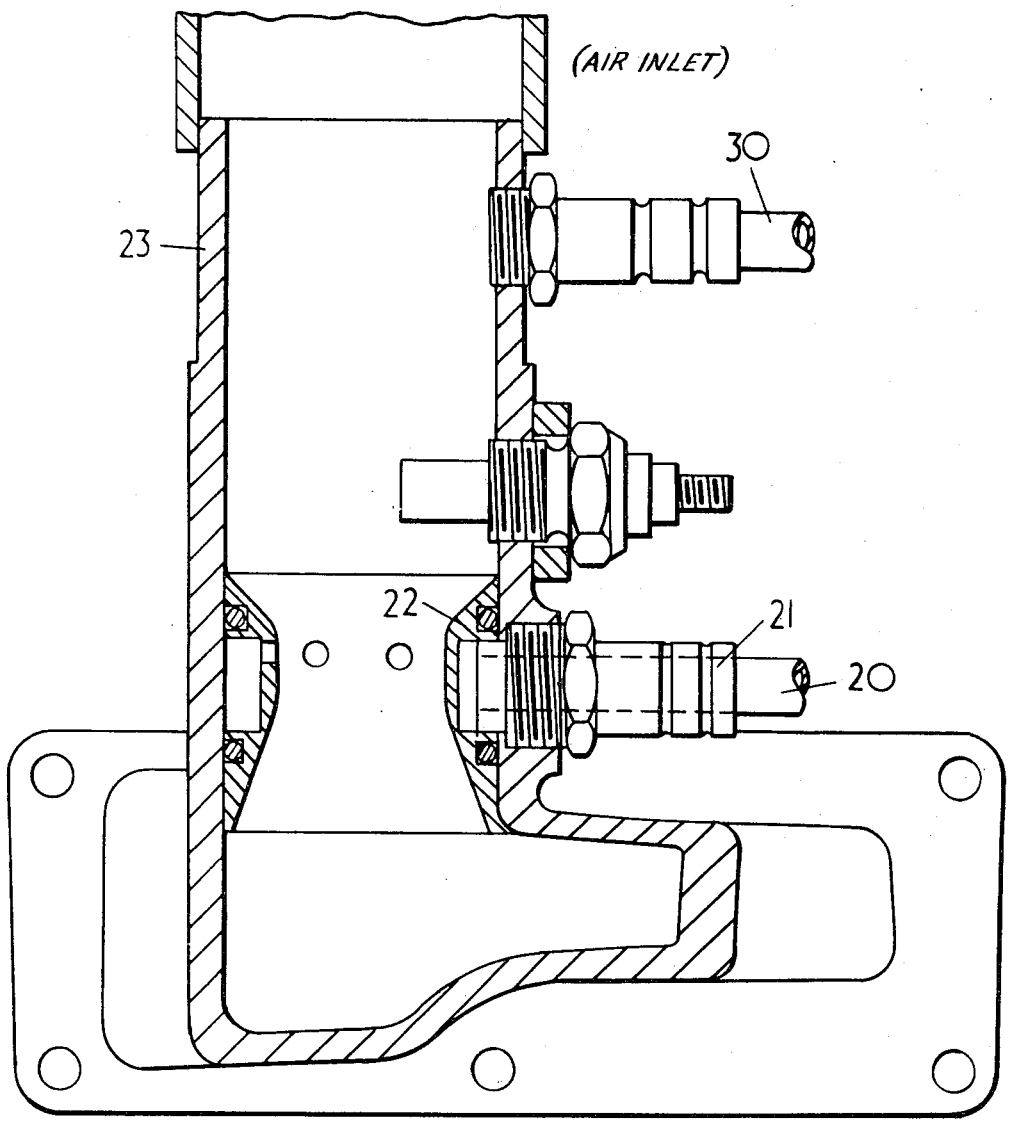
FIG. 3 is a view partly in elevation and partly in section showing the venturi in the air inlet manifold or induction pipe.

In FIG. 2 is shown a tubular member 11 adapted to be fitted into exhaust pipe 11a of the vehicle and having a venturi 14. A first pipe 12 connects the tubular member 11 upstream of the venturi to a pipe 15 opening into the fourth chamber 8. A second pipe 13 opens into the venturi 14 which opens through apertures 16 to the stream of exhaust gas. This pipe 13 is connected to a pipe 13a leading into the third chamber 6 to transmit suction to chamber 6 dependent upon the temperature of the exhaust gases. The second chamber 4 is connected through a pipe 20 with a pipe 21 (see FIG. 3) connected to a second venturi 22 mounted in the air inlet manifold or induction pipe 23 for conducting air into the cylinders of the engine for combustion with the fuel. Thus suction is transmitted to the second chamber dependent upon the rate of flow of combustion air into the engine through the air inlet manifold. A compensation pipe 30 connects the air induction pipe 23 upstream of the venturi 22 with chamber 2 to supply the gaseous fuel to air induction pipe 23 from chamber 2.

A single rod 24 is connected to diaphragms 3 and 7 and is also connected to a flexible diaphragm 25 connected across a central aperture provided in partition wall 5. The rod 24 carries three pairs of rigid plates clamping 24a a central portion of the three diaphragms respectively. The rod abuts a lever 26 mounted on a pivot support 27 to open and close a supply port 28 of gaseous fuel, preferably liquid petroleum gas (l.p.g.) comprising propane and/or butane, obtained from natural gas resources or oil refineries. The supply pipe 20 connects supply port 28 with the first stage of a pressure regulator which connects to a storage tank for storing the l.p.g. under pressure in liquid form. The first state pressure regulator lowers the pressure of the l.p.g. to about one atmosphere and the gaseous fuel then enters chamber 2 through port 28 when the lever 26 has been pivoted about pivot 27 by leftward displacements of rod 24.

In operation, we shall consider when the load is increasing while the r.p.m. is held constant. In this situation, the temperature of the exhaust gases rises and thus the suction along pipe 13 and in chamber 6 increases. It is appreciated that the r.p.m will normally drop as the load increases and hence, to maintain a constant r.p.m. it is necessary either for the driver to operate the normal accelerator pedal to increase the fuel flow or it can be arranged for a governor operated by the engine speed to increase the fuel supply as the engine speed decreases due to increase in load. Since the area of the diaphragm 7 is greater than the diaphragm 25 the resultant force acting on rod 24 will be to the left. Since the r.p.m. of the engine remains constant the suction of the chamber 4 from venturi 22 will remain constant and in equilibrium with the pressure in chamber 2 so the rod 24 will be free to move to the left with diaphragm 3 and thus pivot the lever 26 to open supply port 28 to increase the flow of gaseous fuel into chamber 2. With a decrease in load, the temperature of the exhaust gases drops, the suction in chamber 6 drops and due to gas flowing into chamber 8 through pipe 12, the rod 24 is moved to the right to allow lever 26 to close port 28.

Pipe 21 ensures that an increase in the air flow through induction pipe 23 due to increased r.p.m. will increase suction in chamber 4 tending to move diaphragm 3 to the right which moves rod 24 out of contact with lever 26 which can thus be urged to close supply port 28 by a carefully regulated spring 26a. This movement of diaphragm 3 to the right causes lever 26 to close port 28 so that no more gaseous fuel is allowed into chamber 2.

The size of the rigid plates mounted on either side of the three diaphragms on control rod 24 is selected so that the remaining areas of flexibility are so proportional to each to obtain the required characteristics of increase of gaseous fuel flow with increase of load and speed. The tubular member 11 may be a separate part capable of replacing an equivalent length of exhaust pipe or it may be merely inserted into the exhaust pipe. Similarly, the whole arrangement of pipe 23 including the venturi 22 can either replace an equivalent part in the conventional air manifold or it can be inserted into the conventional air manifold or fitted to the end thereof.

We claim:

1. A control device for a compression-ignition engine having an air induction port and an exhaust pipe, including a venturi means forming a part of the exhaust pipe, a first pipe connected to the venturi means so as to receive suction by the passage of exhaust gasses through the venturi means, a first chamber, said first pipe being connected to the first chamber, a second chamber, a flexible diaphragm separating the second chamber from the first chamber, a second pipe connecting the second chamber to the exhaust pipe, a control valve for controlling the flow of gaseous fuel into the air induction port, and operating means for operating the valve in response to movement of the diaphragm to urge open the control valve.

2. A control device for a compression-ignition engine having an air induction port and an exhaust pipe, including a venturi means forming part of the exhaust pipe, a first pipe connected to the venturi means so as to receive suction by the passage of exhaust gases through the venturi means, a first chamber, said first pipe being connected to the first chamber, a second chamber, a flexible diaphragm separating the second chamber from the first chamber, a second pipe connecting the second chamber to the exhaust pipe, a control valve for controlling the flow of gaseous fuel into the air induction port, and operating means for operating the valve in response to movement of the diaphragm to urge open the control valve, an air induction pipe for conducting air into the engine for combustion, a second venturi means constituting a part of the air induction pipe, a third pipe connected to the second venturi means to receive suction by the passage of air through the second venturi means, a third chamber connected to the third pipe, a second flexible diaphragm separating the third chamber from the second chamber, a fourth chamber, a third flexible diaphragm separating the third chamber from the fourth chamber, a pipe connecting the fourth chamber to the air induction pipe, with the control valve being arranged to control the flow of gaseous fuel into the fourth chamber, and an operating member adapted to be moved by the first, second and third diaphragms to operate the control valve to control the supply of gaseous fuel in accordance with the displacements of the diaphragms.

3. The control device as claimed in claim 2 wherein the proportions of the areas of flexibility of the three diaphragms are selected to give the required rate of increase of supply of gaseous fuel with the two rates of increase of suction from the two venturi means respectively.

4. The control device as claimed in claim 2 wherein the operating member includes a rod connected to each diaphragm, and a control lever pivotably mounted in the fourth chamber arranged to close a port for supplying gaseous fuel to the fourth chamber against which the rod abuts.

5. The control device as claimed in claim 2 including a storage tank for storing the gaseous fuel under pressure and pressure regulator means for supplying gaseous fuel from said tank to the fourth chamber at a reduced pressure.

* * * * *

UNITED STATES PATENT OFFICE
CERTIFICATE OF CORRECTION

Patent No. 3687119      Dated August 29, 1972

Inventor(s) Adrianus Johannes Theodorus Hoogeboom

It is certified that error appears in the above-identified patent and that said Letters Patent are hereby corrected as shown below:

[30] Foreign Application Priority Data

-- August 21, 1968   Great Britain 39990 --

Signed and sealed this 10th day of July 1973.

(SEAL)
Attest:

EDWARD M. FLETCHER, JR.
Attesting Officer

Rene Tegtmeyer
Acting Commissioner of Patents